C. H. CROWELL.
COMPOSITE FABRIC STRIP.
APPLICATION FILED DEC. 21, 1917. RENEWED DEC. 28, 1920.

1,370,413. Patented Mar. 1, 1921.

INVENTOR
Charles H Crowell
BY
Harry L Duncan ATTORNEY

UNITED STATES PATENT OFFICE.

CHARLES H. CROWELL, OF BROOKLYN, NEW YORK.

COMPOSITE FABRIC STRIP.

1,370,413.

Specification of Letters Patent.

Patented Mar. 1, 1921.

Application filed December 21, 1917, Serial No. 208,230. Renewed December 28, 1920. Serial No. 433,743.

*To all whom it may concern:*

Be it known that I, CHARLES H. CROWELL, a citizen of the United States, and resident of the borough of Brooklyn, county of Kings, city and State of New York, have made a certain new and useful Invention Relating to Composite Fabric Strips, of which the following is a specification, taken in connection with the accompanying drawing, which forms part of the same.

This invention relates especially to composite fabric strips or pieces, such as may be used for sealing or binding cartons, packages, or for other purposes, and in which two or more layers of fabric, such as cloth or paper, are permanently united as by an adherent gum or other coating preferably of a substantially impervious character. One or both sides of the composite fabric thus formed may be covered and more or less impregnated with soft or waterproof coating material, preferably of a waxy character, with which the desired coloring matter is incorporated so as to more or less penetrate the side of the composite fabric to which it is applied and color the same and simultaneously render it waterproof. In this way the cloth or paper fabric forming one side of the composite fabric strip may, if desired, be thoroughly impregnated and filled with this waxy waterproof material, except such inner portions as are previously engaged or filled by the adherent uniting material. If desired, the other side of the composite fabric may have applied thereto a hygroscopic or other adhesive coating, such, for instance, as a gum coating which may be moistened and rendered adhesive to apply or fasten the fabric to a package or other article; and to facilitate the rapidity and uniformity of this moistening action, the gum coating may with advantage be formed with moistening cuts or indentations extending more or less through the same so that moisture may more readily penetrate and be absorbed thereby.

No broad claims are made in this application to the transversely arranged stronger and weaker threads disclosed herein which are claimed in my co-pending application which has matured into Patent 1,276,731 of August 27, 1918. The subject-matter of the present application relates particularly to the composite fabric strips or pieces permanently secured together so as to reinforce each other and preferably comprising waxy waterproof material so as to prevent the improper removal of the gummed strip after it has been used for package sealing, for instance.

Figure 1:
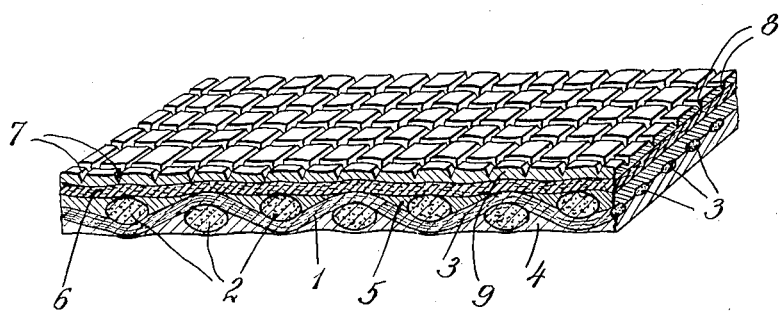
Figure 2:
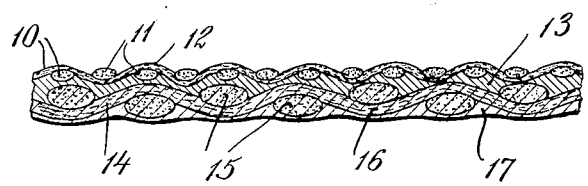

In the accompanying drawing showing in a somewhat diagrammatic way illustrative embodiments of the invention, Figure 1 is a diagrammatic perspective view showing on a greatly enlarged scale a section of a composite fabric strip to which an adhesive coating has been applied; and Fig. 2 shows in section another composite strip.

These composite fabrics may be formed by adhesively uniting with any suitable material webs or pieces of suitable cloth or paper fabric so that the different fabric components mutually strengthen and reinforce each other as by contributing added imperviousness or tensile strength and so forth. As shown in Fig. 1, any suitable paper fabric 6 may be adhesively united to a cloth fabric by any suitable adherent uniting medium 5 so as to preferably permanently unite these two elements while still retaining the desired degree of flexibility in the composite fabric. Relatively impervious or insoluble adhesives may be used for this purpose, such, for example, as shellac or other gums, or ordinary glue or gum adherent coatings may be applied to one or both fabrics and the same forced together, increased flexibility and more or less waterproof properties being secured by the use of proper ingredients in the adherent coatings or suitable treating materials applied thereto. In some cases a cloth backing may be incorporated in such a composite fabric by uniting to Kraft or other paper a plain cloth or gray goods woven fabric which is cheap and also of great strength. It is sometimes desirable also to use a specially woven fabric in which the filling threads are stronger or more firmly twisted, or both, as compared to the warp threads so as to secure greater transverse strength per linear inch in the fabric, and by arranging these stronger filling threads transversely of the composite fabric strips increased transverse strength thereof can be secured. As indicated in Fig. 1, the filling threads 2 may be relatively stronger than the warp threads 1 interwoven therewith and a web of such cloth fabric which may be generally similar to gray goods or plain cloth and preferably unbleached and unfinished, may be permanently joined to relatively light Kraft paper of 30 to 40 pounds, for instance, by the uniting adherent gum or other coating 5 which of course somewhat penetrates the threads or portions of the cloth fabric adjacent the paper facing secured thereto. In some cases it is desirable to first apply the gum or other uniting adherent coating to the paper which for some heavy service may be as thick as 60 pound or heavier Kraft or other paper, and then the cloth backing fabric may be forced into contact with this adherent coating to permanently unite the two fabrics.

One or both surfaces of such a composite fabric may be coated with waterproof or colored coating composition and in many cases it is desirable to apply a colored waxy coating composition in hot melted condition, so that the incorporated or dissolved color can penetrate the adjacent side of the composite fabric sufficiently to render the same waterproof and simultaneously color the same to the desired shade. Such a waterproof coating 4 is diagrammatically indicated in Fig. 1 as penetrating or impregnating the cloth fabric so as to color its threads and simultaneously render them waterproof, it being, of course, understood that the thickness of this coating and the extent to which it projects beyond the threads is considerably exaggerated in this diagrammatic drawing. In such a way the plain or unbleached cloth or other fabric may be quickly and cheaply colored, preferably after being made up into such a composite fabric and the molten waterproof coating which may consist substantially of a fairly hard grade of paraffin wax and the desired coloring matter incorporated and preferably dissolved therein may also in some cases have incorporated inert filling material, such for example, as suitable proportions of clay, starch, flour or talc; or in some cases coloring material with or without such inert filling may be incorporated with casein, glue or other adhesive binding material so as to secure an adherent filling composition of the desired color and produce a colored side or sides of composite fabric of a sufficiently impervious character. These non-waxy coatings may, furthermore, be rendered entirely or substantially waterproof by properly choosing the proportions of the casein or other materials used. Relatively soft waxy coloring waterproof coatings are, however, desirable for most purposes where the composite fabric strips or pieces are to be used for sealing or closing cartons or the like, since in this way a relatively flexible composite strip may be secured, especially if the uniting medium or coating joining the two or more layers of fabrics is not undesirably stiff or thick.

The composite fabric strips or pieces may, if desired, be furnished with a hygroscopic or other adhesive coating which may be moistened or otherwise rendered adhesive to secure the fabric to an article in sealing or forming cartons, boxes, etc. In Fig. 1 a hygroscopic adhesive gum coating 9 of this general character is shown as applied to the facing fabric 6 which is permanently united with the woven backing fabric 1, 2, and this coating may, as indicated be formed with suitable moistening cuts or indentations located relatively closely together and extending in one or both directions across the fabric, if desired, so that the intersecting moistening cuts 7, 8, more or less penetrate the gum coating and facilitate the uniformity and thoroughness with which the moistening liquid or medium penetrates the coating and renders it adhesive. Such moistening indentations also render the material more flexible which is an added advantage, especially where it is used for extending around the corners of packages or the like.

Two or more layers of either cloth or paper fabric may be united to form composite fabric strips or pieces of this general character, and Fig. 2 shows an example of a composite fabric formed of two layers of cloth of somewhat different character. A relatively heavy woven fabric may be used on one side of such a composite fabric and may comprise relatively strong large threads 15 interwoven with relatively lighter weaker warp or other threads 14 and permanently united as by the adherent gum or other uniting medium 13 to a thinner or lighter facing fabric comprising the interwoven threads 11, 12. Increased strength may, of course, be secured in this way and also the combination of considerable strength with a relatively finer or more attractive finish in the facing fabric may be readily secured. By using a relatively impervious uniting coating between the two layers of fabric either one of them may be readily colored and simultaneously waterproofed by applying a colored waxy coating thereto in hot condition so that it more or less penetrates the fabric layer to which it is applied, penetrating even as far as the uniting coating securing the fabrics together. The waxy or other waterproof coating 17 is diagrammatically indicated as applied to the heavier fabric layer so as to substantially permeate or penetrate its threads and color the same as well as render the composite fabric waterproof in this way. Such a colored coating composition may consist largely of paraffin or other waxy material and may, of course, be given increased flexibility by the incorporation of relatively softer petroleum or other oily or waxy products which correspondingly increase the pliability of the composite fabric. Either or both sides of such composite woven or other cloth fabric may be colored or waterproofed in this general way and where only one side is treated in this manner the other side may be subsequently applied to packages or articles as by the use of any suitable adhesive which may be applied to either the article or composite strip before the two are brought together.

This invention has been described in connection with a number of illustrative embodiments, forms, arrangements, numbers of parts and elements, materials, proportions, constructions and orders of steps and methods of use, to the details of which disclosure the invention is not, of course, to be limited, since what is claimed as new and what is desired to be secured by Letters Patent is set forth in the appended claims:

1. The adhesive composite fabric strip having a woven backing fabric of plain cloth with relatively stronger filling threads having a greater strength per linear inch than the interwoven threads and said stronger filling threads extending transversely of the strip to increase its transverse strength, a paper facing fabric permanently united to said backing fabric by a substantially insoluble relatively flexible gum coating, a hygroscopic adhesive gum coating on the exposed side of said facing fabric and formed with moistening indentations to facilitate the penetration of moisture in softening and rendering adhesive said gum coating and a relatively soft flexible waterproof waxy coating having incorporated coloring matter applied to the exposed surface of said backing fabric and substantially penetrating and impregnating its fibers and coloring the same.

2. The adhesive composite fabric strip having a woven backing fabric of plain cloth with filling threads having a greater strength per linear inch than the interwoven threads and said filling threads extending transversely of the strip to increase its transverse strength, a facing fabric permanently united to said backing fabric, a hygroscopic adhesive gum coating on the exposed side of said facing fabric and formed with moistening indentations to facilitate the penetration of moisture in softening and rendering adhesive said gum coating and a waterproof waxy coating having incorporated coloring matter applied to the exposed surface of said backing fabric and substantially penetrating and impregnating its fibers and coloring the same.

3. The adhesive composite fabric strip having a woven backing fabric of plain cloth with filling threads having a greater strength per linear inch than the interwoven threads and said filling threads extending transversely of the strip to increase its transverse strength, a paper facing fabric permanently united to said backing fabric, a hygroscopic adhesive gum coating on the exposed side of said facing fabric and a waxy coating applied to the exposed surface of said backing fabric and coloring the same.

4. The adhesive composite gummed fabric comprising a woven backing fabric, a paper facing fabric permanently and adhesively united to said backing fabric by interposed relatively flexible gum uniting material, a colored flexible waterproof waxy coating having incorporated dissolved coloring matter applied to said backing fabric and substantially penetrating its fibers and coloring the same and a hygroscopic gum adhesive coating applied to the exposed surface of said facing fiber to render said composite fabric adhesive.

5. The adhesive composite gummed fabric comprising a woven backing fabric, a facing fabric permanently and adhesively united to said backing fabric by interposed uniting material, a colored flexible waterproof waxy coating having incorporated dissolved coloring matter applied to said backing fabric and substantially penetrating its fibers and coloring the same and a hygroscopic gum adhesive coating applied to the exposed surface of said facing fiber to render said composite fiber adhesive.

6. The adhesive composite fabric comprising a woven backing fabric, a facing fabric permanently and adhesively united to said backing fabric, a waterproof coating applied to said backing fabric and substantially penetrating its fibers and a hygroscopic adhesive coating applied to the exposed surface of said facing fabric to render said composite fabric adhesive.

7. The composite fabric strip comprising a woven fabric with threads having a greater strength per linear inch than the interwoven threads, said stronger filling threads extending transversely of the strip to increase its transverse strength and a paper fabric permanently and adhesively united thereto by a gum uniting coating, and a colored waterproof waxy coating having incorporated dissolved coloring matter applied to one side of said composite fabric and coloring the same.

8. The composite fabric comprising a woven fabric and a fabric permanently and adhesively united thereto and a colored waterproof coating having incorporated dissolved coloring matter applied to said composite fabric and coloring the same.

9. The composite fabric comprising a plurality of layers of fabric, including a layer of paper facing fabric permanently and adhesively united by a substantially insoluble relatively flexible uniting material, and a colored flexible waterproof waxy coating having incorporated dissolved coloring matter applied to one side of said composite fabric and substantially penetrating and impregnating its fibers and coloring the same without undesirably affecting said uniting material.

10. The composite fabric comprising a plurality of layers of fabric permanently and adhesively united, and a waxy coating having incorporated coloring matter applied to one side of said composite fabric and coloring the same without undesirably affecting said uniting material.

11. The composite fabric comprising a plurality of layers of fabric adhesively united and a waxy coating applied to one side of said composite fabric.

CHARLES H. CROWELL.

Witnesses:
  JEANNETTE HENTER,
  MARIE BETTEX.